(12) United States Patent
Yan (10) Patent No.: US 7,698,780 B2
(45) Date of Patent: Apr. 20, 2010

(54) WHEEL STRUCTURE

(76) Inventor: Li-Lan Yan, No. 36-1, Siaokang Lang, Puzih City, Chiayi County (TW)

( * ) Notice: Subject to any disclaimer, the term of this patent is extended or adjusted under 35 U.S.C. 154(b) by 152 days.

(21) Appl. No.: 11/835,723

(22) Filed: Aug. 8, 2007

(65) Prior Publication Data

US 2009/0038113 A1 Feb. 12, 2009

(51) Int. Cl.
*B60B 33/00* (2006.01)
(52) U.S. Cl. .................................. 16/35 R; 16/18 CG
(58) Field of Classification Search ............... 16/35 R, 16/18 CG, 35 D; 188/19, 20, 68, 30, 2 F
See application file for complete search history.

(56) References Cited

U.S. PATENT DOCUMENTS

| 2,981,969 | A | * | 5/1961 | Fontana | ............... | 16/18 CG |
| 3,479,681 | A | * | 11/1969 | Maslow | ............... | 16/35 R |
| 4,722,114 | A | * | 2/1988 | Neumann | ............... | 16/35 R |
| 5,593,461 | A | * | 1/1997 | Reppert et al. | ............... | 29/11 |
| 6,810,560 | B1 | * | 11/2004 | Tsai | ............... | 16/35 R |
| 6,834,746 | B1 | * | 12/2004 | Lin | ............... | 188/1.12 |
| 2004/0020008 | A1 | * | 2/2004 | Harris et al. | ............... | 16/35 R |

* cited by examiner

*Primary Examiner*—Victor Batson
*Assistant Examiner*—Michael Lee
(74) *Attorney, Agent, or Firm*—Rosenberg, Klein & Lee (57) ABSTRACT

A wheel includes a central holding member, a wheel member, a shell secured around the central holding member, a shaft partly received in the central holding member, a bearing around the shaft inside the central holding member, an upper cover tightly pressed against the bearing, a braking plate mechanism, and a pressing plate mechanism; the upper cover has a connecting extension section having first and second pivotal holes; the braking plate mechanism and the pressing plate mechanism are pivoted on the first and the second pivotal holes of the upper cover respectively; the pressing plate mechanism includes a big pressing plate, and a second pressing plate; when the big pressing plate is depressed, it will press the braking plate mechanism against the wheel member to stop the wheel member; the little pressing plate is used to move the big pressing plate away from the braking plate mechanism.

5 Claims, 7 Drawing Sheets

WHEEL STRUCTURE

BACKGROUND OF THE INVENTION

1. Field of the Invention

The present invention relates to an improvement on a wheel structure, more particularly one, which is relatively easy to assemble; the wheel structure includes an upper cover having a connecting extension section for allowing a braking mechanism to pivot on.

2. Brief Description of the Prior Art

Hospital beds are usually equipped with wheels so that they can serve substantially the same purpose as wheelchairs to transfer patients rapidly and easily from sick chambers to other divisions of a hospital such as an examination division.

Hospital beds and wheelchairs are further equipped with a brake mechanism for stopping/immobilizing the wheels.

A kind of wheel for use with hospital beds/wheelchairs includes a wheel supporting member, a shaft, a wheel member pivoting on the wheel supporting member, a bearing fitted on the wheel support member, a toothed disk arranged under the bearing, and a straightforward motion limiting device, a braking device.

The wheel supporting member has protruding ear portions on two sides thereof. The straightforward motion limiting device includes a straightforward motion limiting board facing the toothed disk, a straightforward motion limiting pedal, and a releasing board pivoted on the protruding ear portions of the wheel supporting member. The braking device includes a brake motion limiting board, and a brake pedal, which is pivoted on the protruding ear portions of the wheel supporting member like the releasing board of the straightforward motion limiting device.

The toothed disk has a straightforward motion limiting cavity, and a brake motion limiting cavity. The straightforward motion limiting board has at a front portion thereof an upward limiting protrusion to pass into the straightforward motion limiting cavity of the toothed disk. Furthermore, the brake motion limiting board has at a front portion thereof several upward protrusions to pass into the brake motion limiting cavity of the toothed disk.

The above wheel has the following drawbacks: It is difficult and takes much time to pivot the brake pedal of the braking device to the protruding ear portions of the wheel supporting member because there is only a small space between the protruding ear portions and the body of the wheel supporting member. And, the brake pedal is prone to shake. Third, the manufacturing cost of the wheel supporting member is relatively high owing to the existence of the protruding ear portions. Because the bearing is only held in position by means of a bearing holder and a fixing sleeve, which is pressed against a top of the bearing holder, it will tilt easily when the shaft is swaying left and right; consequently, the bearing can get damaged after it is used for a certain length of time.

SUMMARY OF THE INVENTION

It is a main object of the present invention to provide an improvement on a wheel structure to overcome the above problems.

A wheel structure according to an embodiment of the present invention includes a central holding member, a wheel member, a shell secured around the central holding member, a shaft partly received in the central holding member, a bearing, an upper cover secured on a top of the central holding member, a braking plate mechanism, and a pressing plate mechanism. The bearing is positioned around the shaft, and held in the central holding member. The upper cover has a connecting extension section sticking sideways from one side thereof, which has a first pivotal hole, and a second pivotal hole. The braking plate mechanism is pivoted on the first pivotal hole of the connecting extension section of the upper cover while the pressing plate mechanism is pivoted on the second pivotal hole. The pressing plate mechanism includes a big pressing plate, and a second pressing plate. When the big pressing plate is depressed, it will press the braking plate mechanism against the wheel member so as to stop the wheel member. The little pressing plate is used to move the big pressing plate away from the braking plate mechanism. Because the pressing plate mechanism and the braking plate mechanism are fitted on the upper cover instead of being directly fitted on the central holding member, they are relatively easy to install.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
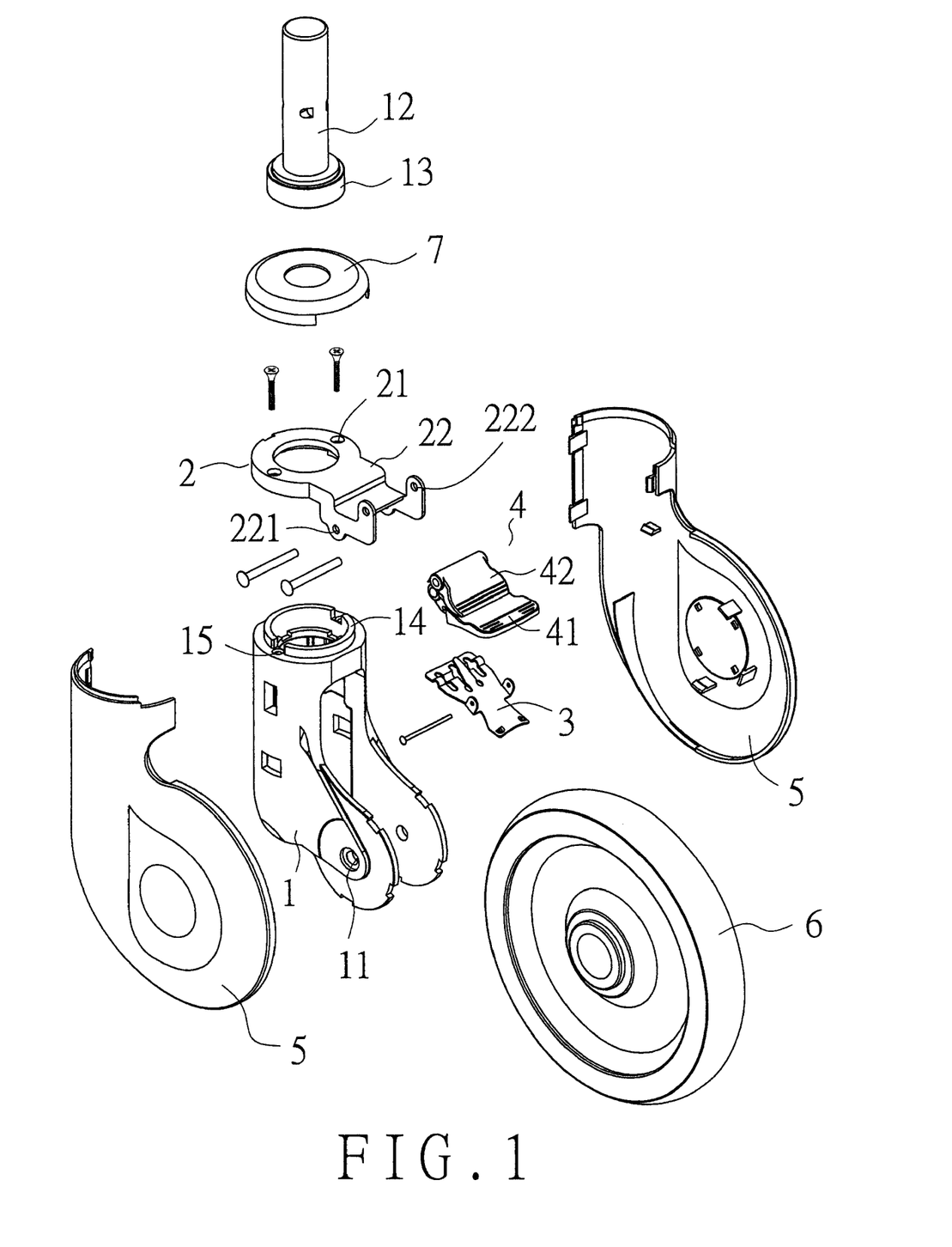
FIG. 1 is an exploded perspective view of the present invention.
Figure 2:
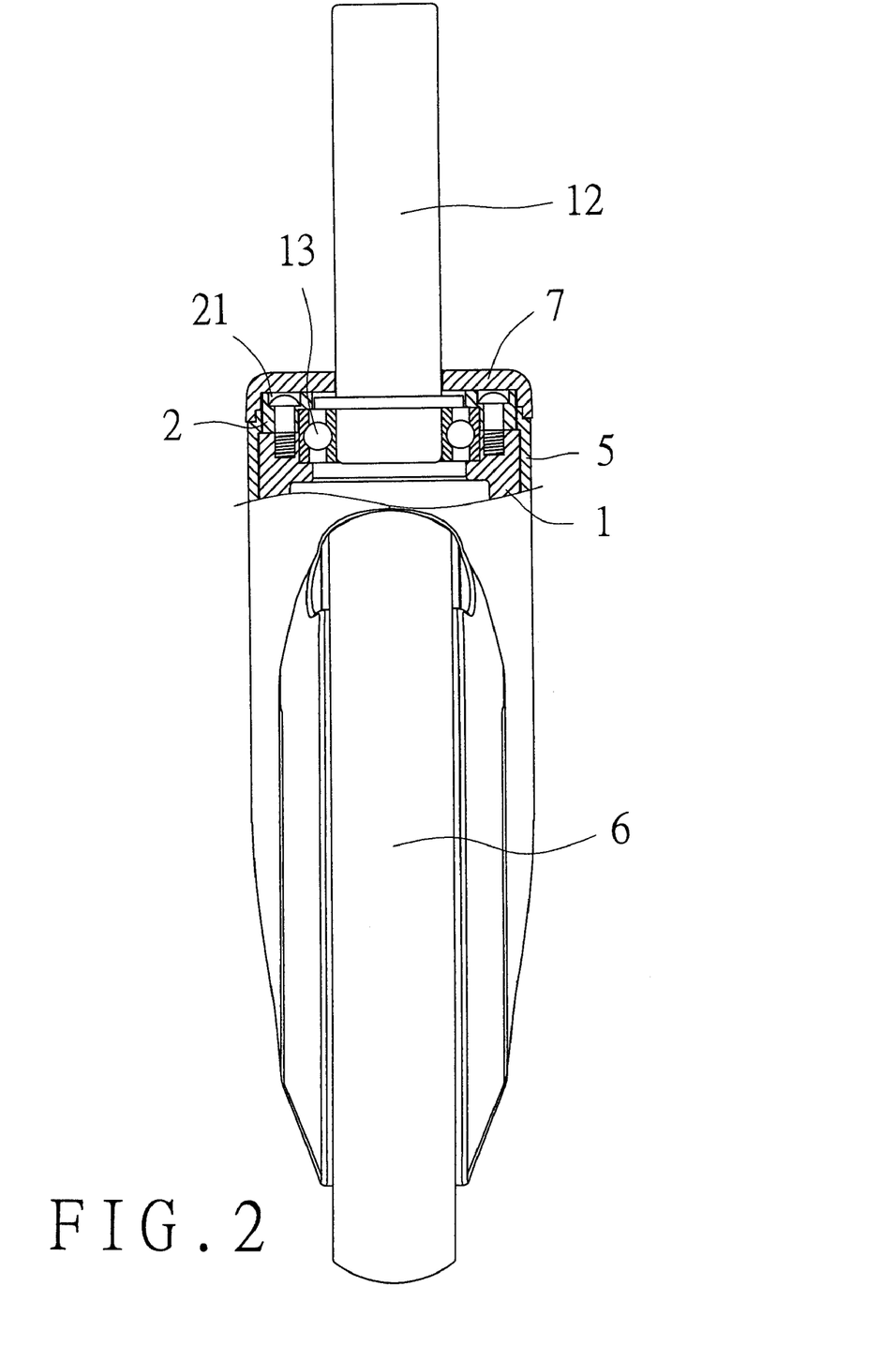
FIG. 2 is a sectional view of the present invention.

Referring to FIG. 1, a preferred embodiment of a wheel structure of the present invention includes:

a central holding member 1, the central holding member 1 has a pivotal extension portion 11 sticking sideways from one side thereof; the central holding member 1 has an uppermost protrusion 14, which has several gaps thereon; the central holding member 1 further has several fixing holes 15, which are formed on the gaps of the uppermost protrusion 14 respectively;

a wheel member 6 pivoting on the pivotal extension portion 11 of the central holding member 1;

a shaft 12 partly received in the central holding member 1;

a bearing 13, which is positioned around the shaft 12, and held in the central holding member 1;

an upper cover 2, the upper cover 2 has several connecting holes 21, and is secured over the uppermost protrusion 14 of the central holding member 1 by means of threaded fixing elements (not numbered) passed through the connecting holes 21 and into the fixing holes 15 of the central holding member 1; the upper cover 2 has a connecting extension section 22 sticking sideways from one side thereof; the connecting extension section 22 has a first pivotal hole 221, and a second pivotal hole 222;

a braking plate mechanism 3 pivoted on the first pivotal hole 221 of the connecting extension section 22 of the upper cover 2;

a pressing plate mechanism 4 pivoted on the second pivotal hole 222 of the connecting extension section 22 of the upper cover 2; the pressing plate mechanism 4 includes a big pressing plate 41, and a little pressing plate 42; and a shell 5 secured around the central holding member 1; the shell 5 further has an outer covering part 7 secured on a top of thereof.

Figure 3:
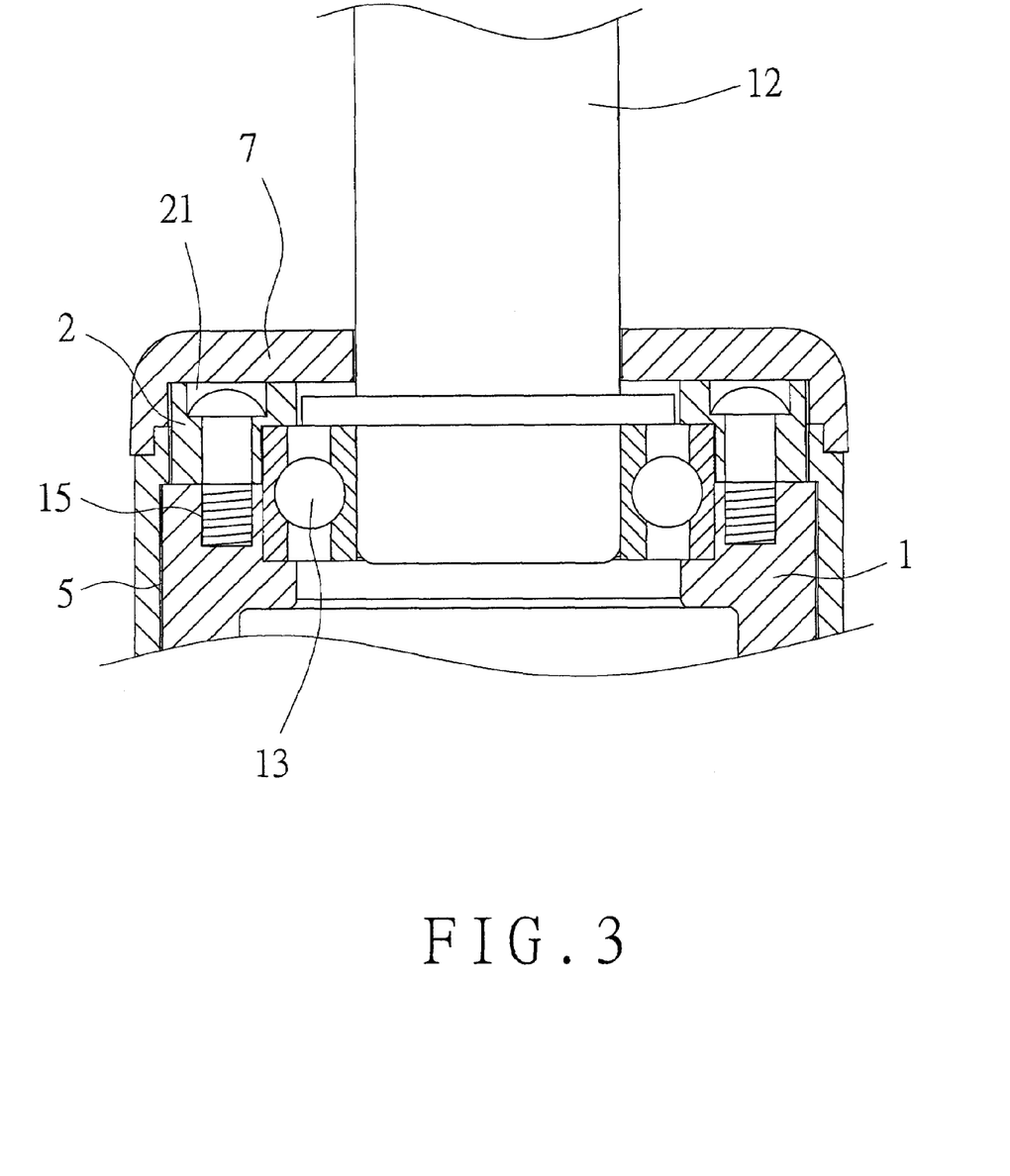
FIG. 3 is an enlarged sectional view of the present invention.
Figure 4:
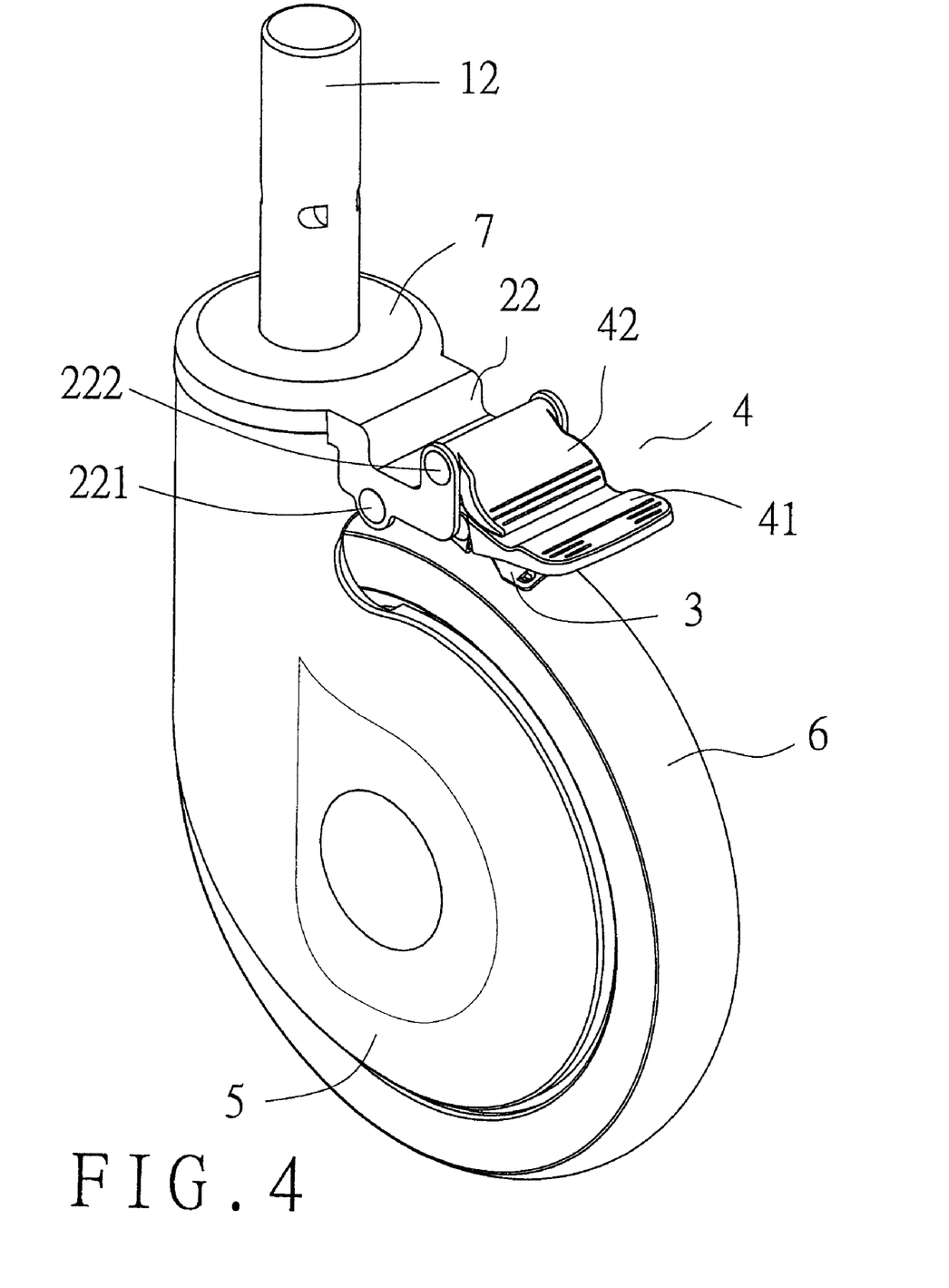
FIG. 4 is a perspective view of the present invention.

In assembly, first the braking plate mechanism 3 is mounted to the first pivotal hole 221 of the connecting extension section 22 of the upper cover 2, and the pressing plate mechanism 4 is mounted to the second pivotal hole 22 of the connecting extension section 22 of the upper cover 2. Then, the wheel 6 is mounted to the pivotal extension portion 11 of the central holding member 1. Third, the bearing 13 joined to the shaft 12 is positioned in the central holding member 1. Fourth, the upper cover 2 is tightly pressed against both the bearing 13 and the uppermost protrusion 14 of the central holding member 1, and secured to the central holding member 1 by means of threaded fixing elements; thus, the bearing 13 is firmly held in the central holding member 1 without possibility of shaking relative to the central holding member 1, as shown in FIG. 3. Finally, the shell 5 is secured around the central holding member 1, as shown in FIG. 4.

Figure 6:
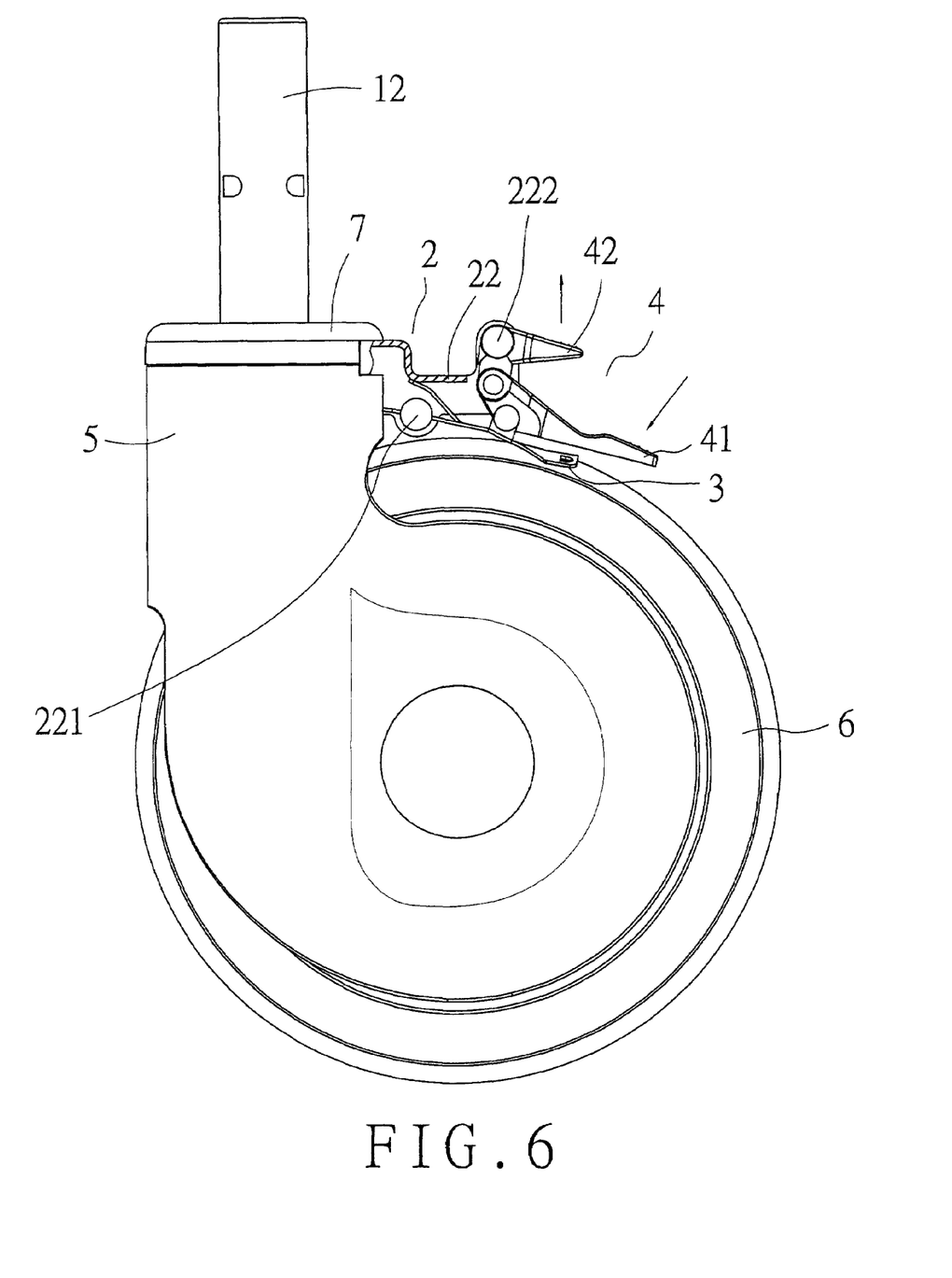
FIG. 6 is a sectional view of the present invention under operation (1)

Shown in FIG. 6 is the wheel structure of the present invention in an immobile configuration. To change the wheel structure to the immobile configuration, the user depresses the big pressing plate 41 of the pressing plate mechanism 4 so as to make the big pressing plate 41 pivot downwards relative to the connecting extension section 22 of the upper cover 2; thus, the big pressing plate 41 presses the braking plate mechanism 3 against the wheel member 6, and the wheel member 6 is stopped; the little pressing plate 42 of the pressing plate mechanism 4 will pivot upwards automatically when the big pressing plate 41 is being pivoted downwards.

Figure 7:
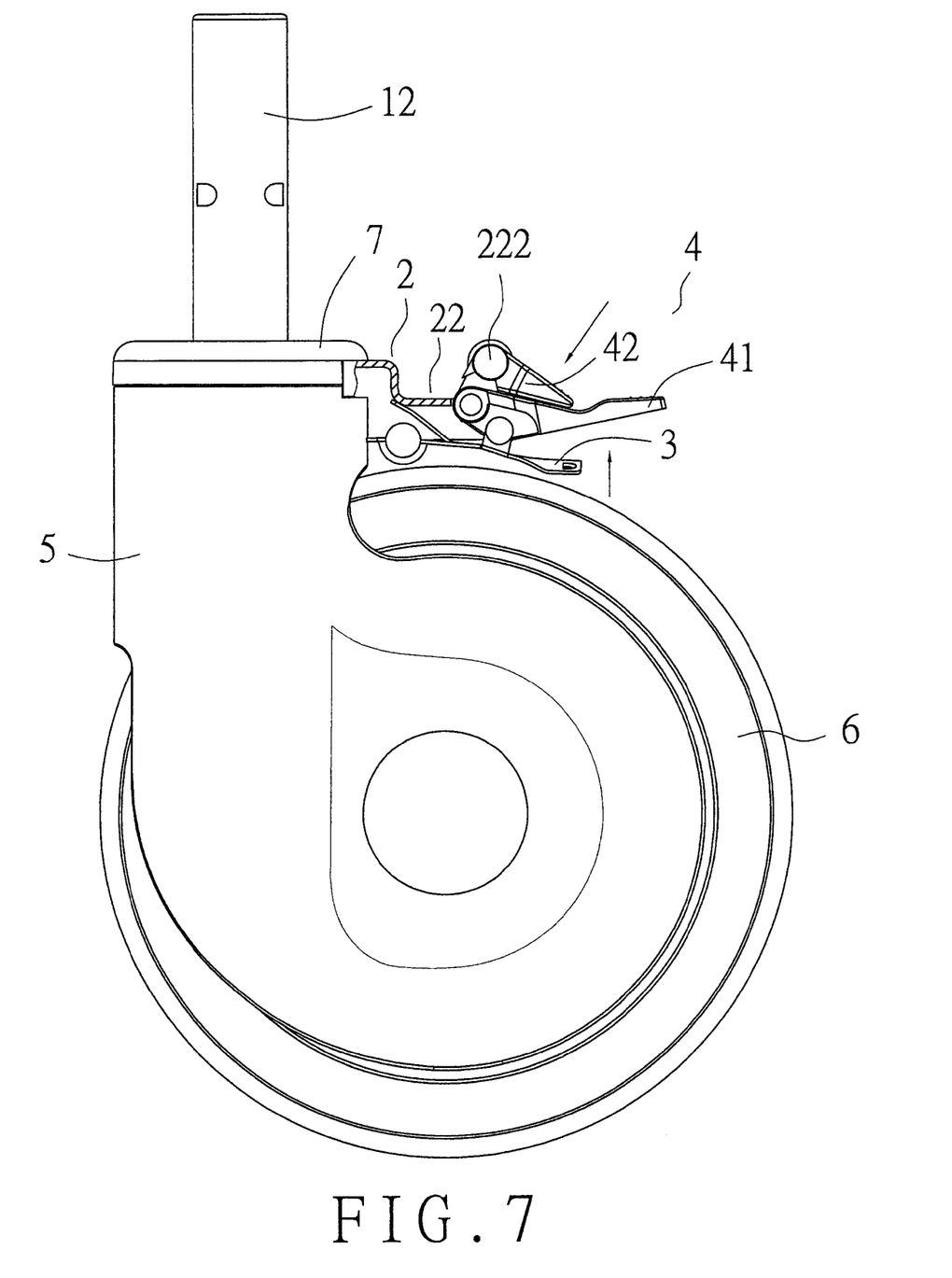
FIG. 7 is a sectional view of the invention under operation (2).

Shown in FIG. 7 is the wheel structure of the present invention in a movable configuration. To change the wheel structure to the movable configuration, the user depresses the little pressing plate 42 of the pressing plate mechanism 4 so as to make the big pressing plate 41 pivot upwards and away from the braking plate mechanism 3; thus, the braking plate mechanism 3 is no longer pressed against the wheel member 6, and the wheel member 6 is free to rotate.

Figure 5:
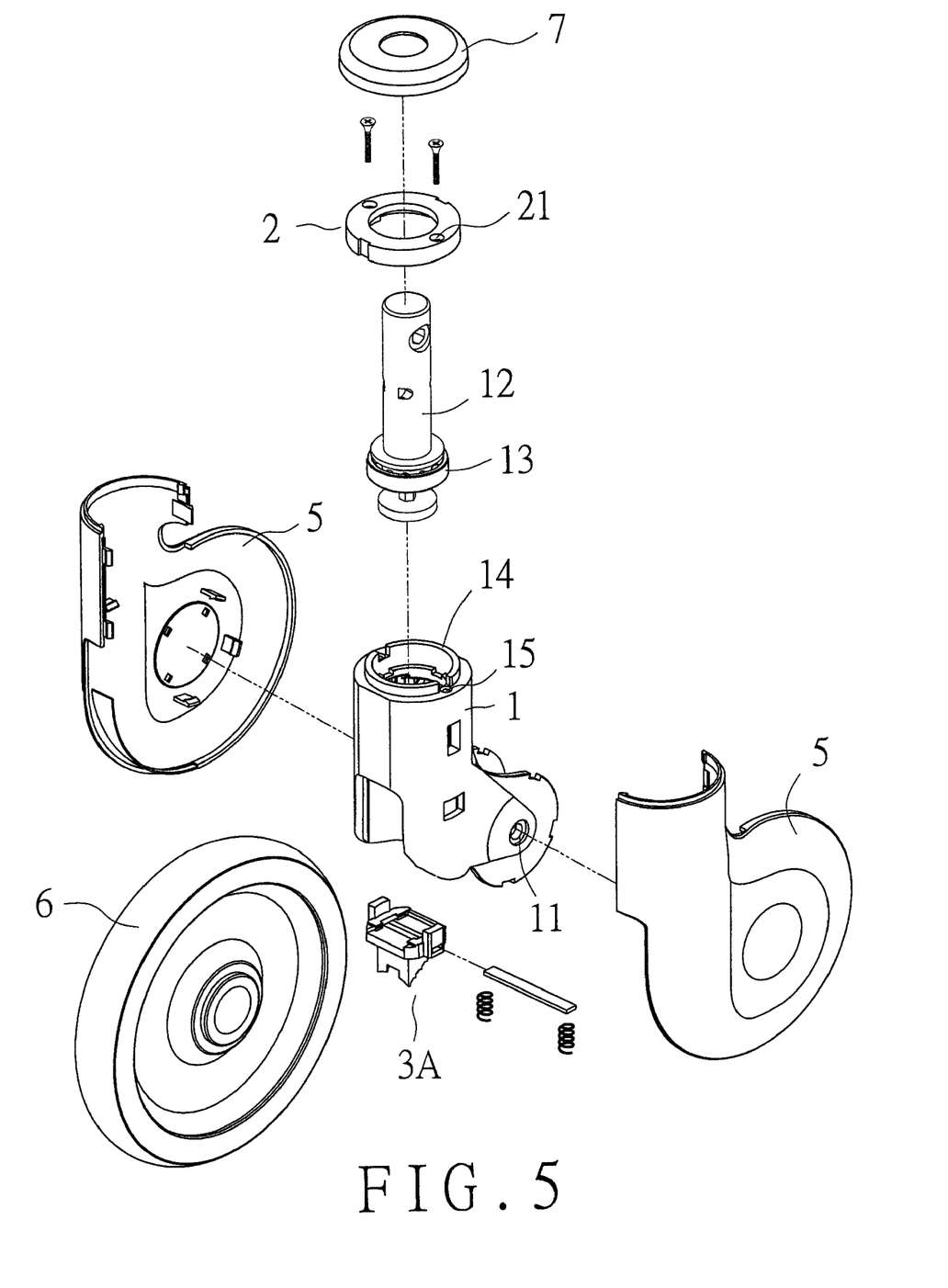
FIG. 5 is an exploded perspective view of another embodiment.

Shown in FIG. 5 is the second preferred embodiment of a wheel structure of the present invention. The wheel structure includes:

a central holding member 1, which has a pivotal extension portion 11 sticking sideways from one side thereof; the central holding member 1 has an uppermost protrusion 14, which has several gaps thereon; the central holding member 1 further has several fixing holes 15, which are formed on the gaps of the uppermost protrusion 14 respectively;

a shaft 12 partly received in the central holding member 1; the shaft 12 is equipped with a central controlling member (not numbered);

a bearing 13 positioned around the shaft 12 and inside the central holding member 1;

a wheel member 6 pivoting on the pivotal extension portion 11 of the central holding member 1;

a brake mechanism 3A, which is arranged above the wheel member 6 within a lower portion of the central holding member 1, and can be controlled with the central controlling member of the shaft 12;

an upper cover 2, the upper cover 2 has several connecting holes 21, and is secured over the uppermost protrusion 14 of the central holding member 1 by means of threaded fixing elements (not numbered) passed through the connecting holes 21 and into the fixing holes 15 of the central holding member 1; and a shell 5 secured around the central holding member 1; the shell 5 further has an outer covering part 7 secured on a top of thereof.

From the above description, it can be seen that the present invention has the following advantages over the prior art:

1. The bearing is firmly held in the central holding member without possibility of shaking relative to the central holding member because the upper cover is fixed and tightly pressed against both the bearing and the uppermost protrusion of the central holding member.

2. The upper cover is formed with the connecting extension section for the pressing plate mechanism and the braking plate mechanism to be pivoted on; the wheel structure of the present invention is easier to manufacture than the prior art because it is relatively difficult to form the protruding ear portions on the wheel supporting member of the prior art, which has several curved portions.

3. The pressing plate mechanism and the braking plate mechanism of the present invention are installed on the upper cover before the upper cover is secured on the central holding member. Therefore, the pressing plate mechanism and the braking plate mechanism are relatively easy to install, and the present invention is easier to assemble.

What is claimed is:

1. A wheel structure, comprising
   a central holding member, the central holding member having an annular uppermost protrusion extending co-axially upward from said central holding member, which has a plurality of gaps disposed thereon; the central holding member having a plurality of fixing holes, which are formed in the gaps of the annular uppermost protrusion respectively;
   a shell secured around the central holding member;
   a shaft partly received in the central holding member;
   a bearing, which is positioned around the shaft, and held in the central holding member; and
   an upper cover secured over the annular uppermost protrusion of the central holding member; the upper cover having a plurality of connecting holes; the upper cover being joined to the central holding member by means of threaded fixing elements, which are passed through the connecting holes of the upper cover, and into the fixing holes of the central holding member.

2. The wheel structure as claimed in claim 1 further comprising an outer covering part secured on a top of the shell.

3. A wheel structure, comprising
   a central holding member;
   a shell secured around the central holding member;
   a shaft partly received in the central holding member;
   a bearing, which is positioned around the shaft, and held in the central holding member;
   an upper cover secured on a top of the central holding member; the upper covering having a connecting extension section protruding sideways from one side thereof; said upper cover and said connecting extension section being integrally formed in a one-piece formation; the connecting extension section having first and second pivotal holes;
   a braking plate mechanism mounted on the first pivotal hole of the connecting extension section of the upper cover; and
   a pressing plate mechanism mounted on the second pivotal hole of the connecting extension section of the upper cover; the pressing plate mechanism including a big pressing plate, and a little pressing plate; one of the big and the little pressing plates being able to cause motion of one of the other one of the big and little pressing plates when being operated.

4. The wheel structure as claimed in claim 3 further comprising an outer covering part secured on a top of the shell.

5. The wheel structure as claimed in claim 3, wherein the central holding member has an uppermost protrusion, which has a plurality of gaps thereon; the central holding member having a plurality of fixing holes, which are formed on the gaps of the uppermost protrusion respectively; the upper cover having a plurality of connecting holes, which are adjacent to corresponding said fixing holes.

* * * * *